(12) United States Patent
Koegler et al.

(10) Patent No.: US 7,307,376 B2
(45) Date of Patent: Dec. 11, 2007

(54) REFLECTOR ASSEMBLY WITH A STARTUP ELEMENT

(75) Inventors: John M. Koegler, Corvallis, OR (US); Timothy F. Myers, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 315 days.

(21) Appl. No.: 10/769,589

(22) Filed: Jan. 30, 2004

(65) Prior Publication Data

US 2005/0168119 A1 Aug. 4, 2005

(51) Int. Cl.
- H01J 5/48 (2006.01)
- H01J 5/50 (2006.01)
- H01J 5/16 (2006.01)

(52) U.S. Cl. ............... 313/113; 313/234; 313/594; 362/296; 362/265; 445/24; 445/26; 445/29

(58) Field of Classification Search ......... 313/607, 313/594
See application file for complete search history.

(56) References Cited

U.S. PATENT DOCUMENTS

| | | | |
|---|---|---|---|
| 3,733,599 A * | 5/1973 | Fantozzi ............ 315/241 S |
| 4,213,170 A * | 7/1980 | Kimball et al. ......... 362/267 |
| 4,677,343 A * | 6/1987 | Hick ..................... 315/61 |
| 4,774,645 A * | 9/1988 | Iwamoto ............... 362/652 |
| 5,010,455 A * | 4/1991 | Luallin et al. .......... 362/519 |
| 5,216,318 A | 6/1993 | Van Dulmen et al. |
| 5,497,299 A * | 3/1996 | Wisler et al. ........... 362/548 |
| 6,078,128 A * | 6/2000 | Gagnon et al. ......... 313/113 |
| 6,210,020 B1 * | 4/2001 | Van Dulmen et al. ... 362/655 |
| 6,505,958 B2 * | 1/2003 | Ooms et al. ........... 362/296 |
| 6,563,267 B1 * | 5/2003 | Van Den Nieuwenhuizen et al. .................. 313/594 |
| 6,614,187 B1 | 9/2003 | Kanzaki et al. |
| 6,776,515 B2 * | 8/2004 | Schmitt ................ 362/539 |
| 6,867,547 B2 * | 3/2005 | Dunisch ............... 313/594 |

* cited by examiner

*Primary Examiner*—Sikha Roy

(57) ABSTRACT

A reflector assembly for use in a digital projector includes a reflector having a reflector opening defined therein, and a startup element fixedly coupled to the reflector such that the reflector and the startup element are configured to allow the replaceable coupling of a lamp assembly to the reflector assembly.

23 Claims, 7 Drawing Sheets

REFLECTOR ASSEMBLY WITH A STARTUP ELEMENT

BACKGROUND

Digital projectors, such as DMD and LCD projectors, project high quality images onto a viewing surface. Both DMD and LCD projectors utilize high intensity lamps and reflectors to generate the light needed for projection. Light generated by the lamp is concentrated as a 'fireball' that is located at a focal point of a reflector. Light produced by the fireball is then directed into a projection assembly that produces images and utilizes the generated light to illuminate the image. The image is then projected onto a viewing surface.

Efforts have been directed at making projectors more compact while making the projected image have higher quality. As a result, the lamps utilized have become more compact and of higher intensity. Higher intensity lamps produce high, even extreme heat. For example, the outer surface of the lamps can approach temperatures of 900 degrees Celsius. As a result, projector designs must withstand the intense heat.

Some designs attempt to withstand the heat by permanently placing the lamp within the reflector. A high temperature epoxy may permanently mount the lamp relative to the reflector. Flexible electrodes from the lamp are then placed through two holes in the reflector and soldered to a metal connection. The other end of the metal connection allows wires to be attached from the electrical connector. When the lamp has surpassed its useful life, both the costly reflector and the mounted lamp, which can together be considered as the light generation assembly, must be replaced.

Recent efforts have been directed to improving the cost effectiveness of the light generation assembly by coupling a startup element to the lamp. The startup element reduces the initial potential required to fire the lamp. The startup elements are typically coupled to the lamp. When the assembly is replaced, the old assembly including the startup element is discarded. Replacement of the startup element with each assembly adds further cost.

SUMMARY

A reflector assembly for use in a digital projector includes a reflector having a reflector opening defined therein, and a startup element fixedly coupled to the reflector such that the reflector and the startup element are configured to allow the replaceable coupling of a lamp assembly to the reflector assembly.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the invention.

Throughout the drawings, identical reference numbers designate similar, but not necessarily identical, elements.

DETAILED DESCRIPTION

The present specification describes a number of exemplary reflector assemblies including a reflector having a reflector opening defined therein, and a startup element fixedly coupled to the reflector such that the reflector and the startup element allow the replaceable coupling of a lamp assembly to the reflector assembly. When the lamp has surpassed its useful life, the lamp assembly may be independently replaced, without replacing the reflector assembly portion of the light generation assembly, which includes the startup element.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
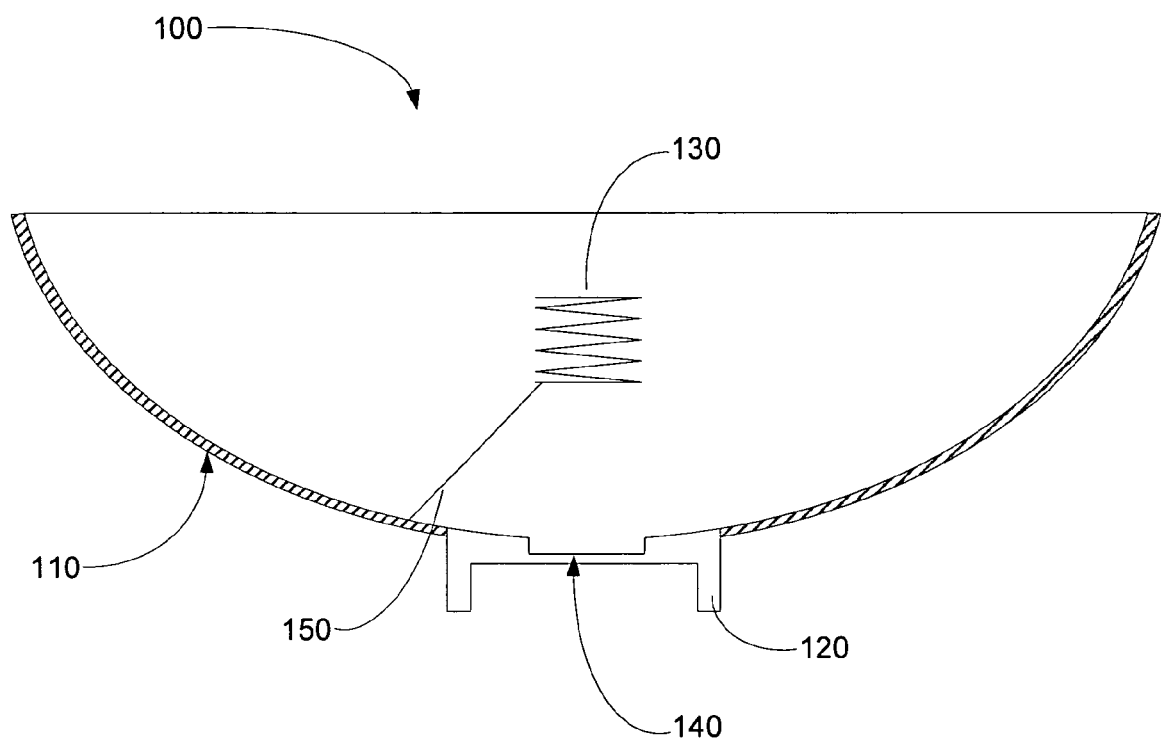
FIG. 1 is a cross-sectional view illustrating a reflector assembly having a startup element coupled thereto according to one exemplary embodiment.

FIG. 1 illustrates a reflector assembly (100) which generally includes a reflector (110), a latching assembly (120), and a startup element (130). The configuration of the reflector assembly (100) allows a lamp assembly to be independently replaced after it has surpassed its useful life, as will be discussed in more detail below.

The reflector (110) may be of any type, including a parabolic or elliptical reflector. Further, the reflector may be configured to be utilized in a number of systems, including, but in no way limited to, projection or television applications. The reflector (110) has a reflector opening (140) defined therein of sufficient size to allow at least part of a lamp to be passed there through.

The startup element (130), which is fixedly or permanently coupled to the reflector, is configured to lower the initial ionization potential of a lamp assembly. The startup element (130) may be of any suitable type. In the illustrated implementation, the startup element (130) is a coil of metallic material. The specific operation of the startup element (130) in lowering the initial ionization potential will be discussed in further detail with reference to FIG. 2.

The startup element (130) is coupled to a potential coupler (150) which couples the startup element to a potential source outside the reflector assembly (100). The potential coupler (150) may also be of sufficient structural strength to hold the startup element (130) in place. Thus, the coupler (150) may provide both potential and support. The potential coupler (150) holds the startup element (130) in position at a designated distance from the reflector opening (140). In one embodiment, the potential coupler (150) may include a wire for providing a potential to the startup element (130) that is coupled to a support structure for holding the startup element (130) in place. The support structure may be a thin rod of metal of sufficient stiffness to support the wire. Further, the support structure may be coupled to the reflector (110) at one or more locations. The potential coupler (150) allows the startup element (130) to be coupled to an external potential source while providing sufficient support to the startup element (130) to allow a lamp to be removably coupled to the startup element (130).

Figure 2A:
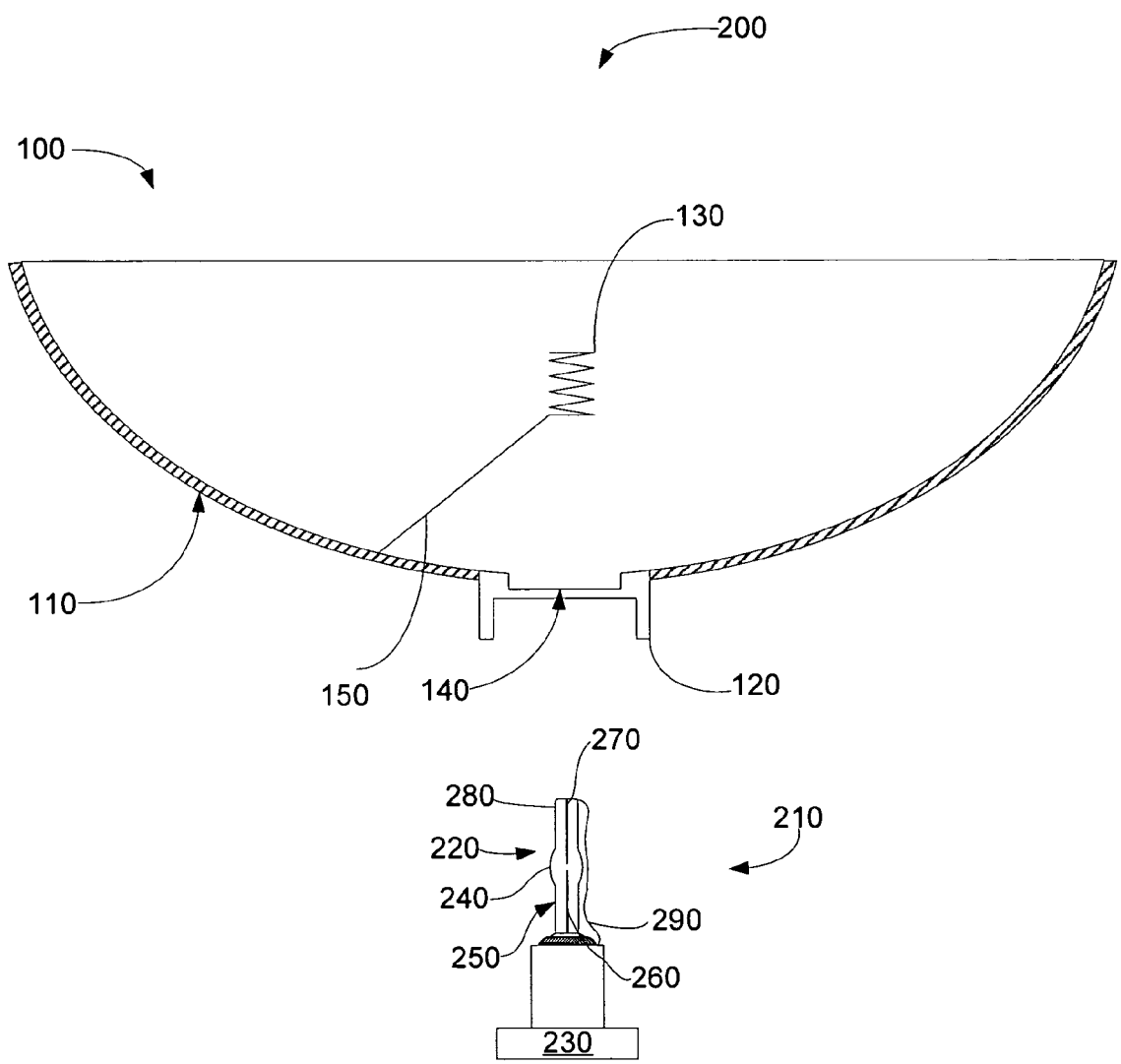
FIG. 2A is an exploded cross-sectional view illustrating a light generation assembly according to one exemplary embodiment.
Figure 2B:
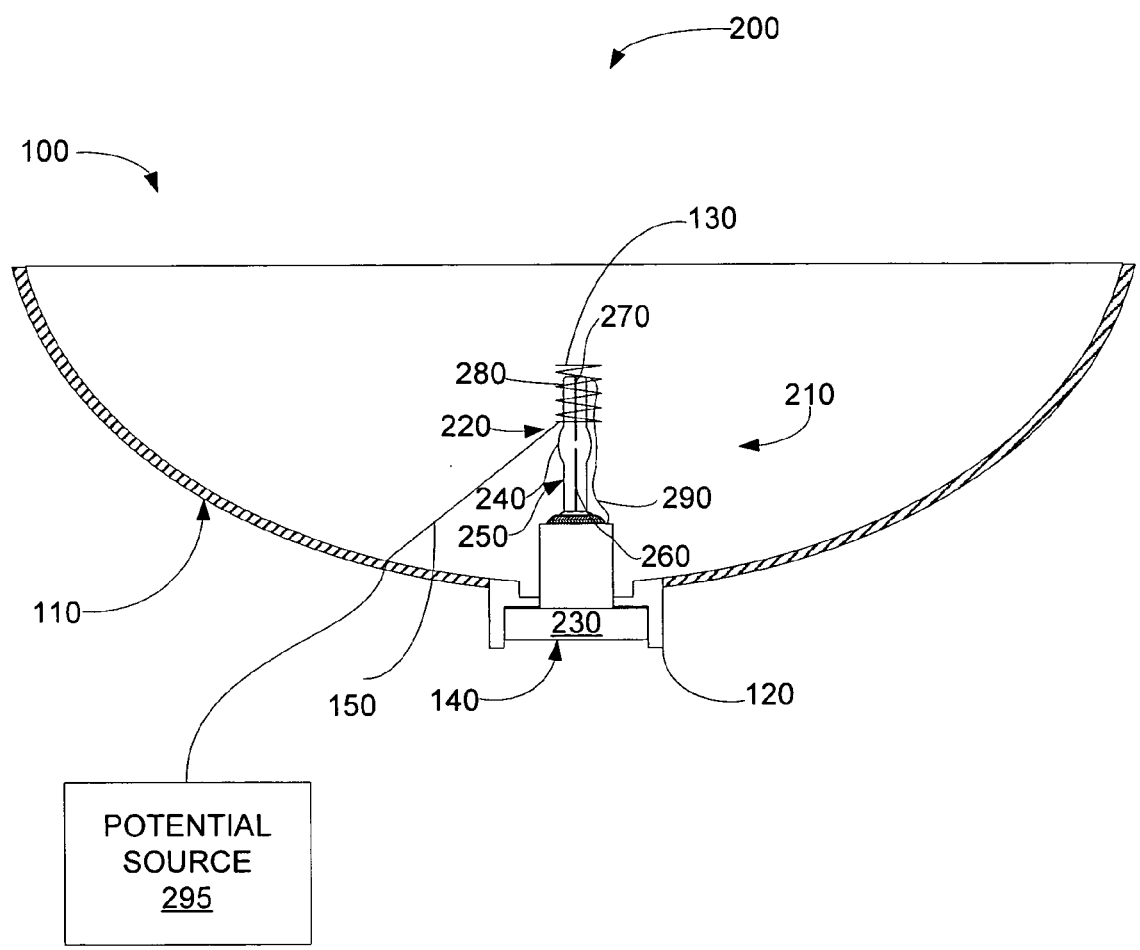
FIG. 2B is a cross-sectional view illustrating an assembled light generation assembly according to one exemplary embodiment.

FIGS. 2A-2B illustrate a light generation assembly (200) having a reflector assembly (100) and a lamp assembly (210) configured to be replaceably coupled to the reflector assembly. The lamp assembly (210) includes a lamp (220) coupled to a lamp header (230). FIG. 2A shows the lamp assembly (210) before it is coupled to the reflector assembly (100) while FIG. 2B shows the lamp assembly (210) replaceably coupled to the reflector assembly (100)

The lamp header (230) is configured to facilitate the electrical coupling of the lamp (220) to an electrical source. The lamp portion (220) of the lamp assembly (210) is aligned with respect to a standardized reflector and is then secured to the lamp header (230). The lamp (220) may be secured to the lamp header (230) by any suitable means. For example, heat resistant adhesive may be used to secure the lamp (220) to the lamp header (230).

The lamp (220) may be of any type that produces sufficient light for projection and/or television applications. According to one exemplary embodiment, the lamp includes an ultra-high pressure (UHP) lamp. For ease of reference, a UHP lamp will be described in the illustrated implementation. During operation, the lamp (220) creates a fireball in a central portion (240) of a mercury gas filled tube (250) that results in the generation of a plasma caused by an arc across first and second electrodes (260, 270). The arc is caused by a potential difference or potential across the first and second electrodes (260, 270).

The potential difference across the electrodes is caused by providing potentials of different polarities to each of the first and second electrodes (260, 270). Any suitable means may be used to provide the potential difference. In the illustrated implementation, a distal end (280) of the lamp (220) is coupled to a wire (290) that extends from the mercury gas filled tube (250) to the second electrode (270). The wire (290) extends from the distal end (280) of the lamp (220) to the lamp header (230) where it is connected to an electrical connection forming part of the lamp header (230). Similarly, the first electrode (260) is also coupled to an electrical connection which is part of the lamp header. The lamp header (230) is subsequently coupled to an external potential source, which provides potential to light and operate the lamp assembly (210).

The potential necessary to initially light the lamp (220), or the initial ionization potential, is higher than the potential necessary to operate the lamp (220). The startup element (130) is configured to reduce the initial ionization potential. When assembled, the startup element (130) is coupled to a distal end (280) of the lamp (220). More specifically, the distal end (280) of the lamp (220) is passed through the reflector opening (140) and through the startup element (130) such that a portion of the distal end (280) of the lamp (220) is within the inner diameter of the startup element (130). A potential is applied to the startup element (130) through the potential coupler (150) which is in turn coupled to an external potential source. The external potential sources that provide power to the startup element and the lamp may be, but are not necessarily the same sources.

The potential source for the startup element may provide a potential of a single polarity to the startup element. For example, the potential provided through the potential coupler (150) may be a negative potential. The potential coupler (150) may be any suitable structure, such as a wire, configured to provide a potential of a single polarity to the startup element. Before the lamp is fired, a potential difference results to due to the disparity between the negative potential provided by the potential coupler (150) and the zero potential existing in the lamp (220). The potential provided to the startup element (130) is provided by the potential source (295). Consequently, the potential difference excites the gas contained in the distal end (280) of the lamp (220) due to a potential difference between the startup element (130) and the gas in the distal end (280) of the lamp (220).

The excitation of the gas within the distal end (280) of the lamp (220) produces ultraviolet (UV) light. Although the potential difference is not sufficient to fire the lamp, the UV light generated lowers the ionization potential of the gas contained in the central portion (240) of the lamp (220) thereby lowering the ionization potential of the lamp (220). For example, typical lamps require an initial ionization potential of approximately 20 kV while a lamp according to the present system and method may have an initial ionization potential of approximately 5 kV or less. As a result, the lamp (220) may have a relatively long operating life. Long operating life in turn decreases the operating costs of a system utilizing the lamp (220) having the startup element (130) coupled thereto. This long operating life is provided by the startup element (130), which remains with the reflector assembly (100) when the lamp is replaced.

As seen in FIG. 2B, the lamp assembly (210) is proximately coupled to the reflector assembly (100) by passing at least the distal end (280) of the lamp (220) through the reflector opening (140). When assembled, a portion of the lamp (220) is coupled to the startup element (130). As previously discussed, the central portion (240) of the lamp is aligned with respect to the lamp header (230). Placing the lamp header in contact with the latching assembly (120) causes the lamp to be positioned at a precise distance from the reflector opening (140). This precise distance corresponds with placement of the central portion (240) at the focal point of the reflector (110). As a result, a central portion (240) of the lamp (220) may be placed at the focal point of the reflector (110). When the central portion (240) of the lamp (220) is placed at the focal point of the reflector (110), a maximum amount of light generated by the lamp (220) is reflected out of the light generation system (200) by the reflector assembly (100).

When assembled, the latching assembly (120) engages the lamp assembly (210) to maintain the central portion (240) at the focal point of the reflector (110), thereby maximizing the light produced by the light generation system (200). The latching assembly (120) also allows for the rapid coupling and removal of the lamp assembly (210) to the light generation assembly (200) such that the lamp assembly (210) may be replaced without replacing the entire light generation assembly (200). As a result, operating costs of the light generation assembly (200) are significantly reduced. Moreover, replacement occurs less frequently and costs are further reduced by placing the startup element (130) within the reflector assembly (100). As a result, replacement of the lamp assembly (210) does not require replacement of the startup element (130).

During the useful life of the lamp assembly (210), the lamp assembly may remain coupled to the reflector assembly (100). When the lamp (220) has surpassed its useful life, the lamp assembly (210) may be independently replaced, without replacing the reflector assembly (100) portion of the light generation assembly (200), which includes the startup element (130). In addition, use of the startup element (130) prolongs the life of the lamp (220), which further reduces the operating costs of the system.

Figure 3:
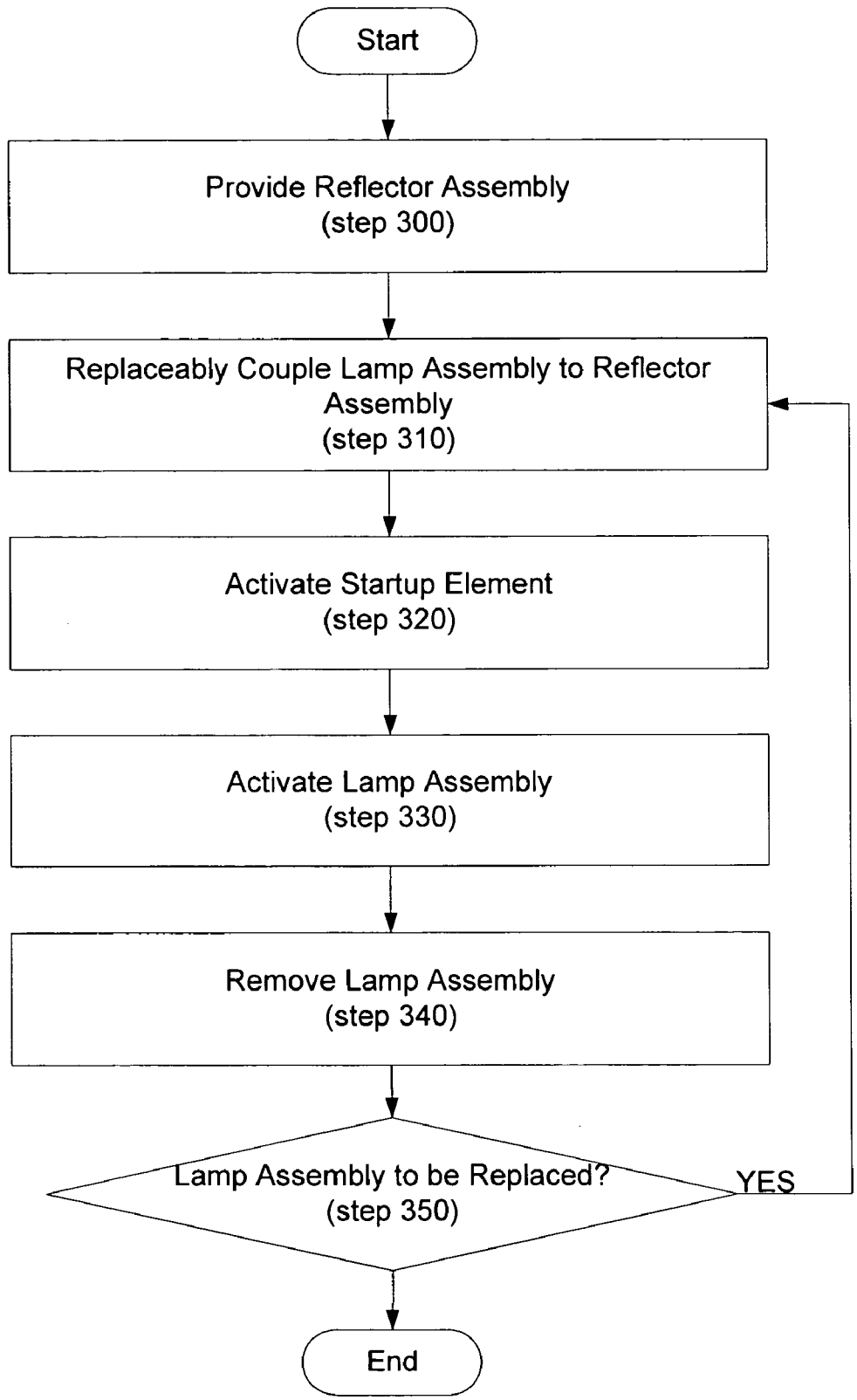
FIG. 3 is a flowchart illustrating a method of using a light generation assembly according to one exemplary embodiment.

FIG. 3 illustrates a method of using a light generation assembly (200; FIG. 2) similar to that shown in FIG. 2. The method begins by providing a reflector assembly (100) having a startup element (130) coupled thereto (step 300). The reflector assembly provided includes a startup coil placed within a reflector. The reflector assembly also includes a latching assembly. The latching assembly (120; FIG. 2), the startup element (130; FIG. 2), and the reflector opening (140; FIG. 2) are configured to allow the replaceable coupling of a lamp assembly (210; FIG. 2) to the reflector assembly (step 310). The lamp assembly (210; FIG. 2) includes a lamp header (230; FIG. 2) configured to provide power to the lamp assembly. The configuration of the lamp, the startup element, and the reflector assembly will be discussed in further detail below with reference to FIG. 4.

Once the lamp assembly (210; FIG. 2) has been replaceably coupled to the reflector assembly (step 310), the startup element (130; FIG. 2) is activated (step 320). According to one exemplary implementation, the startup element is activated by providing potential to the startup element in order generate ultraviolet (UV) light as previously discussed.

Once the startup element (130; FIG. 2) has been activated to lower the initial ionization potential of the lamp, the lamp is activated (step 330). Light generated by the lamp (220; FIG. 2) is directed out of the light generation assembly (200; FIG. 2), where it may be used by a projection system in forming images. During the useful life of the lamp assembly (210; FIG. 2), it remains coupled to the reflector assembly (100; FIG. 2). During the useful life of the lamp the startup element (130; FIG. 2) and lamp (220; FIG. 2) will be repeatedly activated (steps 320-330) because the lamp is typically powered off after a period of use.

After the lamp assembly (220; FIG. 2) has surpassed its useful life, it is removed (step 340) and replaced (step 310). When the lamp assembly is removed (step 340), the lamp (220; FIG. 2) and the lamp header (230; FIG. 2) may be removed without requiring replacement of the startup element (130; FIG. 2), because the startup element (130) is coupled to the reflector (110) rather than permanently mounted to the lamp (220). If it is determined that the lamp assembly is to be replaced (YES, step 350), another lamp is coupled to the reflector assembly (step 320). Consequently, the lamp assembly may be replaced without replacing the entire light generation assembly, thereby reducing the operating costs of the system.

Figure 4:
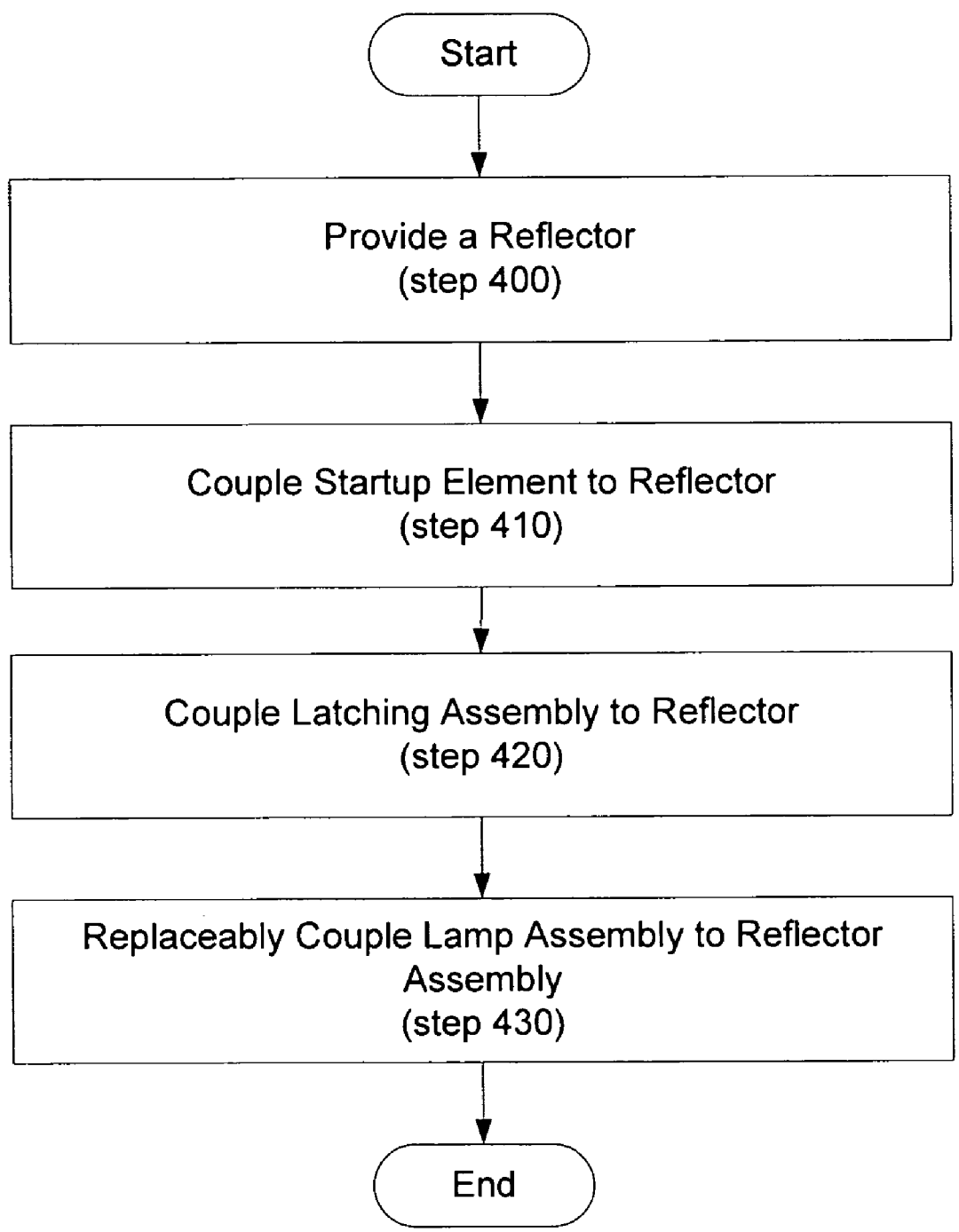
FIG. 4 is a flowchart illustrating a method of forming a light generation assembly according to one exemplary embodiment.

FIG. 4 illustrates a method of forming a light generation assembly. As shown in FIG. 4, the method begins by providing a reflector (step 400). The reflector may be of any type including, but in no way limited to, an elliptical or a parabolic reflector assembly. The reflector includes a reflector opening defined therein, the reflector opening being of sufficient size to allow the passage of a distal end of a lamp assembly. A startup element is then coupled to the reflector (step 410). To couple the reflector to the startup element, a second hole or opening may be formed in the reflector to allow the startup element to be coupled to a potential source external to the reflector. Accordingly, a wire may be run to the startup element through the hole. In addition, the wire may be run along a structural element, or the wire may be sufficiently stiff to act as a structural element. The structural element supports the startup element with respect to the reflector. As such, the structural element allows the startup element to remain in a substantially fixed position. A lamp assembly is more easily coupled to the startup element when the startup element is held in position, as will be discussed in more detail below.

Once the distal end of the lamp has been passed through the reflector opening and slipped into the startup element, the lamp assembly is positionally secured. To this end a latching assembly is also coupled to the exterior or the lamp assembly (step 420). The latching assembly may be any structure that is configured to engage the lamp header of the lamp assembly. Accordingly, the latching assembly holds the lamp assembly with respect to the reflector assembly by engaging the lamp header.

Coupling the latching assembly and the startup element (steps 410-420) to the reflector forms a reflector assembly. Both the startup element and lamp header are configured to receive a lamp assembly that may be removably coupled thereto (step 430). The lamp assembly includes a lamp header configured to provide power to the lamp assembly. In the exemplary implementations discussed with reference to FIG. 1, the startup element is a coil type startup element. The lamp is slipped through the reflector opening and the startup element such that the startup element is coupled to the distal end of the lamp. Slipping the lamp into the startup element is made easier if the startup element is supported by the support structure, as previously discussed. The close proximity between the lamp and the startup element allows for capacitive coupling between the two when a potential is applied to the startup element. According to one exemplary embodiment, the lamp and the startup element may be separated a distance ranging from 0 to 0.125 inches. The lamp header may be of any type able to withstand the heat generated by the lamp assembly and able to facilitate the replaceable coupling of the lamp assembly to a reflector assembly. One example of a suitable lamp header includes a ceramic lamp header with a lamp engaging protrusion. The lamp and the startup element may be placed at least partially within the lamp engaging protrusion.

As discussed, a startup element coupled to a reflector assembly according to the present apparatus and method allows a lamp assembly to be replaced without replacing the entire light generation assembly, which includes the startup element.

Figure 5A:
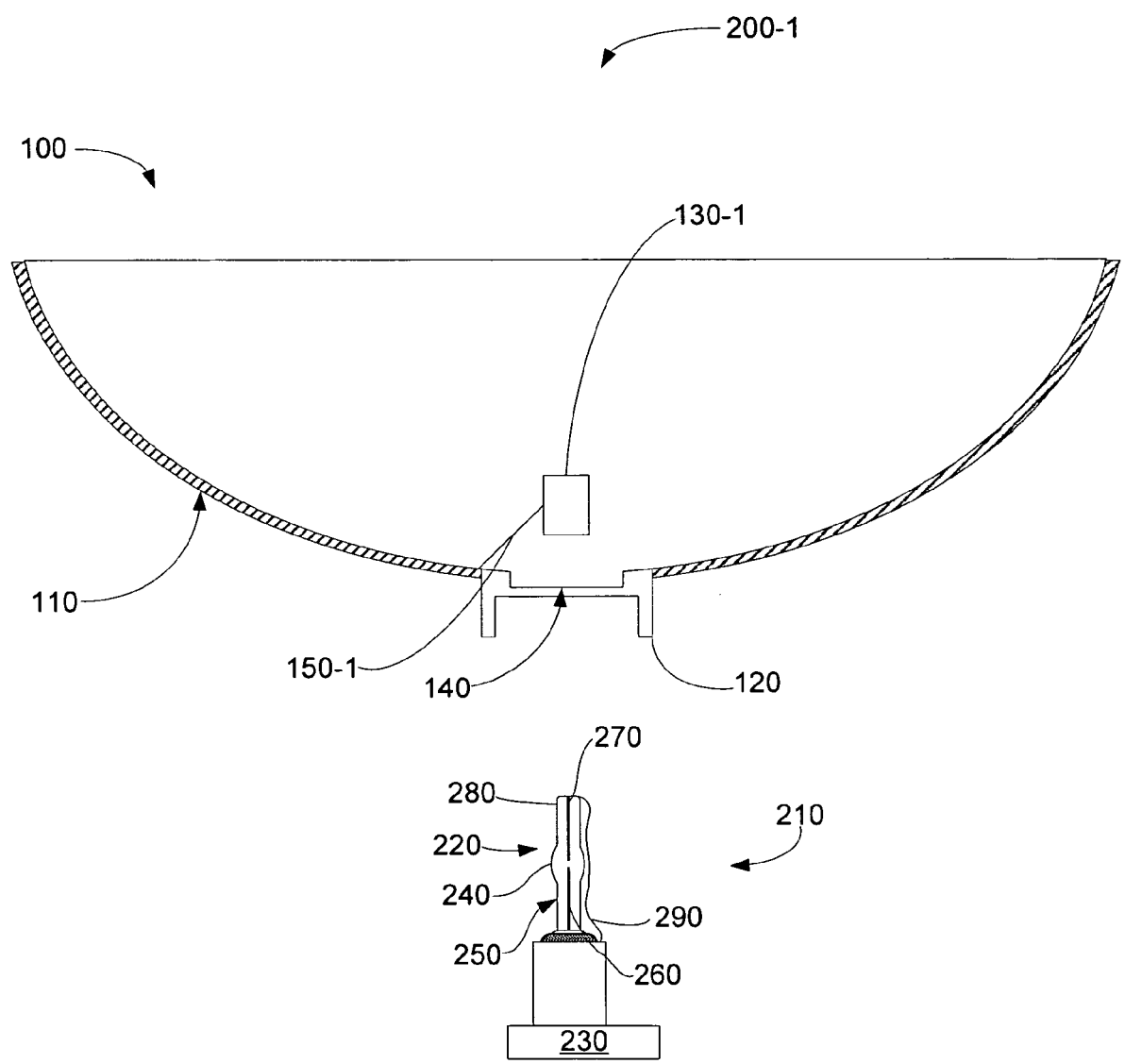
FIG. 5A is an exploded cross-sectional view illustrating light generation assembly according to one exemplary embodiment.
Figure 5B:
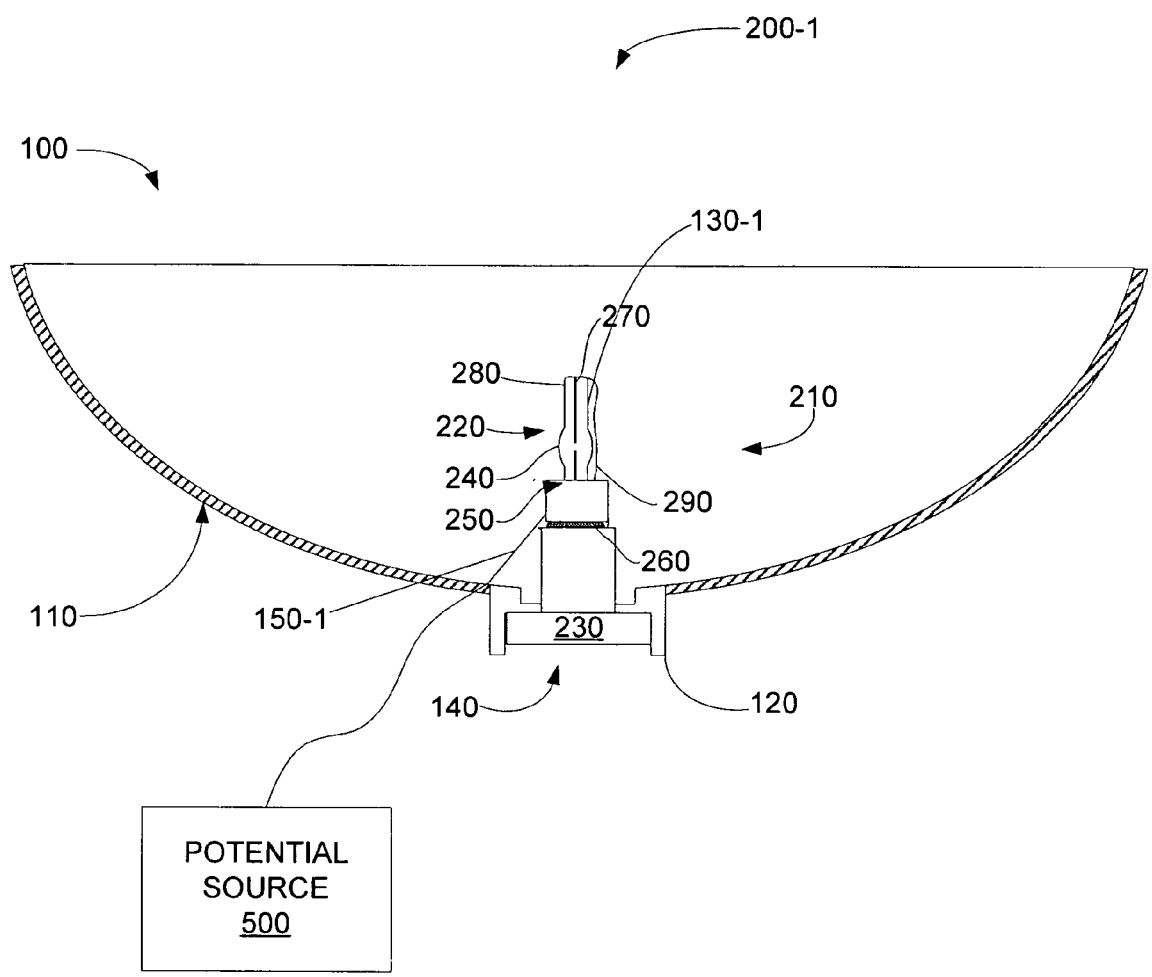
FIG. 5B is a cross-sectional view illustrating an assembled light generation assembly according to one exemplary embodiment.

FIGS. 5A-5B illustrate a light generation assembly (200-1) having a shield type startup element (130-1). The shield type startup element (130-1) is configured to couple to a proximal end of a lamp assembly (210). The shield type startup element (130-1) has an opening of sufficient size to allow the distal end (280) of the lamp (220) to pass through. The shield type startup element (130-1) is supported by a support structure (150-1).

FIG. 5B illustrates the assembled light generation assembly (200-1). The operation of the startup element is substantially similar to the startup coil (130; FIG. 2) discussed above, except that the shield type startup element (130-1) is coupled to the proximal end of the lamp (220). Accordingly, a larger portion of the lamp (220) is passed through the startup element (130-1) that at least partially surrounds the proximal end of the lamp. Also shown in FIG. 5B, the potential source (500) provides potential to the startup element (130-1) through the potential coupler (150-1)

The preceding description has been presented only to illustrate and describe the present method and apparatus. It is not intended to be exhaustive or to limit the present apparatus and method to any precise form disclosed. Many modifications and variations are possible in light of the above teaching. It is intended that the scope of the present method and apparatus be defined by the following claims.

What is claimed is:

1. A reflector assembly for use in a digital projector, comprising:
   a reflector including a reflector opening, and
   a startup element permanently coupled to said reflector and fixed in position at a designated distance from said reflector opening for insertion of a lamp assembly, wherein said reflector and said startup element are configured to allow a replaceable coupling of the lamp assembly to said reflector assembly.

2. The assembly of claim 1, wherein said startup element comprises a coil.

3. The assembly of claim 1, wherein said startup element comprises a shield.

4. The assembly of claim 1, further comprising a potential coupler configured to couple said startup element to a potential source.

5. The assembly of claim 4, further comprising:
   a structural element coupled to said reflector and said startup element;
   wherein said potential coupler rims along said structural element.

6. The assembly of claim 4, wherein said potential coupler comprises a structural element for supporting said startup element.

7. The assembly of claim 1, further comprising a latching assembly configured to engage a lamp header of said lamp assembly.

8. The assembly of claim 1, wherein said reflector comprises a parabolic reflector.

9. The assembly of claim 1, wherein said reflector comprise an elliptical reflector.

10. A method of forming a reflector assembly used in digital projectors, comprising:
    affixing a startup element to a reflector such that said startup element is supported at a predetermined location within said reflector prior to coupling of a lamp assembly with said reflector assembly; and
    coupling a latching assembly to an opening defined in said reflector wherein said startup element and said latching assembly cooperate to allow replaceable coupling of a lamp assembly to said reflector assembly.

11. The method of claim 10, wherein said startup element comprises a startup coil.

12. The method of claim 10, further comprising coupling a wire to said startup element wherein said wire is configured to couple said startup element to a potential source.

13. The method of claim 12, further comprising:
    coupling a structural element to said reflector for supporting said startup element;
    wherein said wire runs along said structural element.

14. The method of claim 12, wherein said wire comprises a structural element configured to support said startup element.

15. The method of claim 10, wherein said latching assembly is configured to engage a lamp header of said lamp assembly.

16. The method of claim 10, wherein said reflector comprises a parabolic reflector.

17. The method of claim 10, wherein said reflector comprise an elliptical reflector.

18. A reflector assembly for use in a digital projector, comprising:
    a reflector including a reflector opening,
    a startup element fixedly coupled to said reflector,
    a startup element fixedly coupled to said reflector and fixed in position at a designated distance from said reflector opening for insertion of a lamp assembly, a support structure, separate from the lamp assembly, for fixedly coupling said startup element to said reflector, said support structure being coupled to said reflector and to said startup element to support said startup element within said reflector, wherein said startup element is configured to receive a portion of the lamp assembly that is removably coupled to said reflector assembly.

19. The assembly of claim 18, wherein said startup element comprises a coil.

20. The assembly of claim 18, wherein said startup element comprises a shield.

21. The assembly of claim 18, wherein said support structure further comprises a potential coupler configured to couple said startup element to a potential source.

22. The assembly of claim 21, wherein said support structure comprises a rod and said potential coupler comprises a wire running along said rod.

23. The assembly of claim 18 wherein said support structure is also coupled to a potential source to provide a potential to said startup element.

* * * * *

UNITED STATES PATENT AND TRADEMARK OFFICE
CERTIFICATE OF CORRECTION

PATENT NO. : 7,307,376 B2
APPLICATION NO. : 10/769589
DATED : December 11, 2007
INVENTOR(S) : John M. Koegler et al.

It is certified that error appears in the above-identified patent and that said Letters Patent is hereby corrected as shown below:

In column 7, line 28, in Claim 5, delete "rims" and insert -- runs --, therefor.

Signed and Sealed this

Eighth Day of July, 2008

JON W. DUDAS
*Director of the United States Patent and Trademark Office*